United States Patent
Nevarez, Sr.

(12) 
(10) Patent No.: US 6,173,559 B1
(45) Date of Patent: Jan. 16, 2001

(54) METHOD AND APPARATUS FOR REMOVING DEBRIS FROM HARVESTED VEGETABLES

(76) Inventor: Enrique Nevarez, Sr., 240 E. South Main, Gila Bend, AZ (US) 85337

(*) Notice: Under 35 U.S.C. 154(b), the term of this patent shall be extended for 0 days.

(21) Appl. No.: 09/260,625

(22) Filed: Mar. 1, 1999

Related U.S. Application Data

(62) Division of application No. 08/819,375, filed on Mar. 17, 1997.

(51) Int. Cl.$^7$ .................................................. A01D 61/00
(52) U.S. Cl. ........................ 56/16.5; 56/164 R; 56/327.1
(58) Field of Search ........................ 56/327.1, 328.1, 56/14.4, 14.5, 16.5, 16.6, 16.4 R, 16.4 A, 16.4 B, 16.4 C, 16.4 D; 460/114

(56) References Cited

U.S. PATENT DOCUMENTS

| | | | |
|---|---|---|---|
| Re. 34,678 | 8/1994 | Fischer et al. ........................ 56/12.9 |
| 91,251 | 6/1869 | Merriman . |
| 513,397 | 1/1894 | Judie . |
| 1,243,095 | 10/1917 | Patterson . |
| 1,509,403 | 9/1924 | Howard et al. . |
| 1,545,900 | 7/1925 | Henton . |
| 1,590,883 | 6/1926 | Bryant . |
| 1,771,516 | 7/1930 | Wentz . |
| 2,671,554 | 3/1954 | Melroe . |
| 2,819,745 | 1/1958 | Minera . |
| 3,162,003 | 12/1964 | Schapansky . |
| 3,294,094 | * 12/1966 | Dreyer ................................ 56/327.1 |
| 3,452,525 | 7/1969 | Francis . |
| 3,521,710 | * 7/1970 | Tillotson ............................. 56/327.1 |
| 3,580,375 | 5/1971 | Nunes ...................................... 198/8 |
| 3,613,796 | * 10/1971 | Cayton ................................. 171/27 |
| 3,672,133 | 6/1972 | Mestad .................................. 56/13.5 |
| 3,678,677 | 7/1972 | Miller et al. ............................ 56/327 |
| 3,705,483 | 12/1972 | Jarrell et al. .......................... 56/13.5 |
| 3,726,345 | * 4/1973 | Harrell et al. ........................ 171/101 |
| 3,775,933 | 12/1973 | Prescott et al. ........................ 56/126 |
| 3,821,987 | 7/1974 | Shepardson et al. ................. 171/61 |
| 3,986,561 | 10/1976 | Bettencourt et al. ................. 171/14 |
| 4,003,192 | 1/1977 | Jordan et al. ........................ 56/27.5 |
| 4,067,179 | 1/1978 | Schneider .............................. 56/297 |
| 4,089,421 | 5/1978 | Porter .................................... 209/97 |
| 4,091,931 | 5/1978 | Button et al. .......................... 209/73 |
| 4,147,017 | 4/1979 | Cortopassi et al. .................. 56/16.5 |
| 4,166,505 | 9/1979 | West ....................................... 171/1 |
| 4,174,755 | 11/1979 | Siri ......................................... 171/27 |
| 4,234,045 | 11/1980 | Porter .................................... 171/14 |
| 4,262,477 | 4/1981 | Turold et al. ........................... 56/327 |
| 4,262,750 | 4/1981 | Merkley et al. ....................... 171/27 |
| 4,267,689 | 5/1981 | Schneider et al. ..................... 56/53 |
| 4,285,002 | 8/1981 | Campbell .............................. 357/74 |

(List continued on next page.)

FOREIGN PATENT DOCUMENTS

| 374889 | * 6/1990 | (EP) ................................ 56/327.1 |
|---|---|---|
| 2556923 | * 6/1985 | (FR) ................................ 56/327.1 |

Primary Examiner—Robert E. Pezzuto
Assistant Examiner—Arpad Fabian Kovacs
(74) Attorney, Agent, or Firm—J. William Wigert, Jr.

(57) ABSTRACT

A harvester for harvesting leafy vegetables, lettuce and the like which are very delicate and which are grown in precisely configured beds of either a regular or single width (40 inches or 42 inches) or a double width (80 inches). A single conveyer/cutter assembly is located on one side of the harvester centerline and has a width somewhat exceeding the width of a single width bed. The wheels on each side are separated by somewhat more than the width of a double bed. The driver and engine is located on the other side of the centerline. Such a harvester can cut single width beds, or can cut double width beds by making a first pass in one direction and a second pass in the other direction. The single conveyer/cutter reduces the amount of debris and unwanted material from the harvested leafy vegetables.

7 Claims, 12 Drawing Sheets

U.S. PATENT DOCUMENTS

| | | | |
|---|---|---|---|
| 4,294,063 | 10/1981 | Bianchi | 56/16.4 |
| 4,335,570 * | 6/1982 | Fitzmaurice | 56/327 R |
| 4,519,191 | 5/1985 | Ledebuhr et al. | 56/331 |
| 4,570,426 * | 2/1986 | Bettencourt et al. | 56/327 R |
| 4,629,005 * | 12/1986 | Hood, Jr. et al. | 171/20 |
| 4,965,993 | 10/1990 | Butler et al. | 56/327.1 |
| 4,972,662 | 11/1990 | Korthuis et al. | 56/10.2 |
| 5,035,109 | 7/1991 | Van Den Top | 56/327.1 |
| 5,099,636 * | 3/1992 | Yoder | 56/327.1 |
| 5,226,972 * | 7/1993 | Bell | 134/25.1 |
| 5,316,519 * | 5/1994 | Johnson | 460/96 |
| 5,480,353 * | 1/1996 | Garza, Jr. | 460/148 |
| 5,860,859 * | 1/1999 | Meester | 460/144 |

\* cited by examiner

METHOD AND APPARATUS FOR REMOVING DEBRIS FROM HARVESTED VEGETABLES

This is a divisional of application Ser. No. 08/819,375, filed Mar. 17, 1997.

BACKGROUND OF THE INVENTION

1. Field of the Invention

The present invention relates to a harvester for leafy vegetables and a process for harvesting leafy vegetables.

2. Description of the Related Art

Harvesting young or early growth leafy vegetables presents particular problems not found when harvesting other vegetables. By "leafy vegetables" it is meant that family of specialty lettuces and other leafy greens which, when mixed together for sale and consumption are sometimes referred to as "spring mix," "mixed greens," or "baby greens." For example, this includes lettuces, such as green romaine, red romaine, sierra, lola rosa, tango, green leaf, red leaf, little gem, red butter, read oak, red perella and green perella. It also includes greens such as arugula, maxine, red mustard, green mustard, spinach, tat tai, red chard and red russian kale. If such leafy vegetables are grown under certain conditions, the harvested produce can be certified as organically grown.

Harvesters are known for cutting some vegetables such as spinach, cabbage, watercress and the like. Recently, consumer demand has required harvesting a variety of lettuces at an early stage of growth while the leaves are small and close to the ground.

This has presented challenges unmet by mechanical harvesters and consequently all young leafy vegetables has been largely by hand.

One problem in mechanically harvesting leafy vegetables is that the plants are very small when harvested. This means that the leafy vegetables must be grown in rows or beds which are prepared to be as flat as possible. The widths of the beds are also dimensionally controlled as much as possible. A typical bed is either 40 inches or 42 inches wide, as measured from the center of furrows on either side of the bed. Separating each of the beds are furrows which allow the passage of the wheels of farm equipment used to cultivate, plant, maintain, and harvest the leafy vegetables. With such small plants, a harvester must be able to maintain the cutting mechanism approximately ¼ inch off the surface of the bed.

Another problem is that the leafy vegetables are very tender. They are easily bruised by conventional harvesters. Bruised or damaged leafy vegetables are not saleable and must be discarded, reducing yield.

One conventional harvester uses a sickle cutter formed at the bottom of a double belted conveyer system. The bottom belt is made of a metal mesh and the top conveyer is made of a flexible material with "fingers" formed in layers on the flexible belt. The fingers hold the cut leafy vegetables in contact with the lower conveyer as the cut produce is conveyed up the conveyer to the discharge area. This is necessary so that wind, for example, does not blow the cut leafy vegetables off of the conveyer.

This arrangement has several deficiencies. First, the fingers, while flexible, tend to damage or bruise the delicate leafy vegetables, thereby reducing yield. The fingers tend to break and the entire conveyer must be removed and replaced with a new or repaired one. This is both expensive and time consuming. Also, the presence of the upper fingered belt makes it difficult to inspect and clean the area between the two conveyer belts.

Another problem occurs because of the trend towards the use of double size rows or beds in addition to standard size beds. The width of these beds is 80 inches, or double the width of a conventional 40 inch bed. Eighty inch beds eliminate every other furrow in comparison with a field of 40 inch beds. This increases the area of cultivatable land, and hence yield, up to 50% to 80%. No known harvester is presently available which can harvester 40 inch, 42 inch and 80 inch beds.

It is very important that when the "spring mix" is ultimately shipped to customers and consumers that it be clean and completely free of sticks, weeds, or other debris. Also, any bruised or damaged leafs must be eliminated. Cotyledon, the poorly formed embryonic underleaves, must also be eliminated. When harvesting leafy vegetables manually this can largely be done when the plants are selected and cut by the field worker. Existing harvesting techniques introduce undesirable amounts of debris and unwanted materials with the harvested leafy vegetables.

SUMMARY OF THE INVENTION

In accordance with the present invention, a harvester for leafy vegetables is provided which is capable of use with beds of 40 and 42 inches, as well as double size rows of 80 inches. This is accomplished by separating the two front wheels and the two back wheels by somewhat more than the distance of an 80 inch bed, so each pair of wheels run in every other furrow. A conveyer/cutter assembly is designed to exceed the width of a single row, i.e, 36 inches. The conveyer/cutter assembly is located on one side of the centerline of the harvester, the centerline running lengthwise midway between the front pair of wheels and the back pair of wheels. The operator station and engine are located on the other side of he centerline.

Cutting 40 or 42 inch beds is done conventionally, with the harvester cutting a full bed as the harvester passes along each bed. To cut an 80 inch bed, the harvester makes a first pass in one direction along a bed, cutting half the width of the bed. The harvester then makes a second pass in the opposite direction to cut the remaining half width.

In accordance with the present invention, damage to the freshly cut leafy vegetables is reduced by eliminating the upper conveyer belt. A single conveyer belt is used with periodic cleats which hold the cut leafy vegetables as they are conveyed upwardly to the discharge area. Yield is increased because there are no fingers to damage the freshly cut leafy vegetables. To keep the wind from blowing the leafy vegetables away an enclosure, such as a hood, is provided which surrounds the conveyer belt. The hood is hingedly mounted to permit easy access to the conveyer belt.

A reel is mounted at the bottom of the conveyer belt. It is provided with brushes or fingers. The reel serves two purposes. The first is to engage the plants being cut to provide a slight amount of pressure against them as they engage the cutter assembly. This results in a better and cleaner cut. Secondly, they "brush" the cut leafy vegetables onto the conveyer for transportation up to the discharge area.

In accordance with another aspect of the present invention, an improved method of harvesting and processing leafy vegetables is described. After the harvester of the present invention cuts the leafy vegetables, the produce is kept and transported in baskets, often referred to as "totes." Before the harvested leafy vegetables are washed, dried, mixed, weighed and packaged in a processing facility, they are transported to a shaker/cleaner, typically towed near the field where harvesting takes place. The totes are manually unloaded onto an input conveyer.

They are then discharged onto a conveyer made of a metal mesh. The mesh allows debris and other unwanted material to fall therethrough. To increase the fall-out of unwanted debris, the mesh is shaken or oscillated as it carries the leafy vegetable harvest to a discharge chute. The shaker/cleaner is adapted to have workers on either side of the mesh conveyer to manually pick out debris and unwanted materials.

DESCRIPTION OF THE PREFERRED EMBODIMENT

Figure 1:
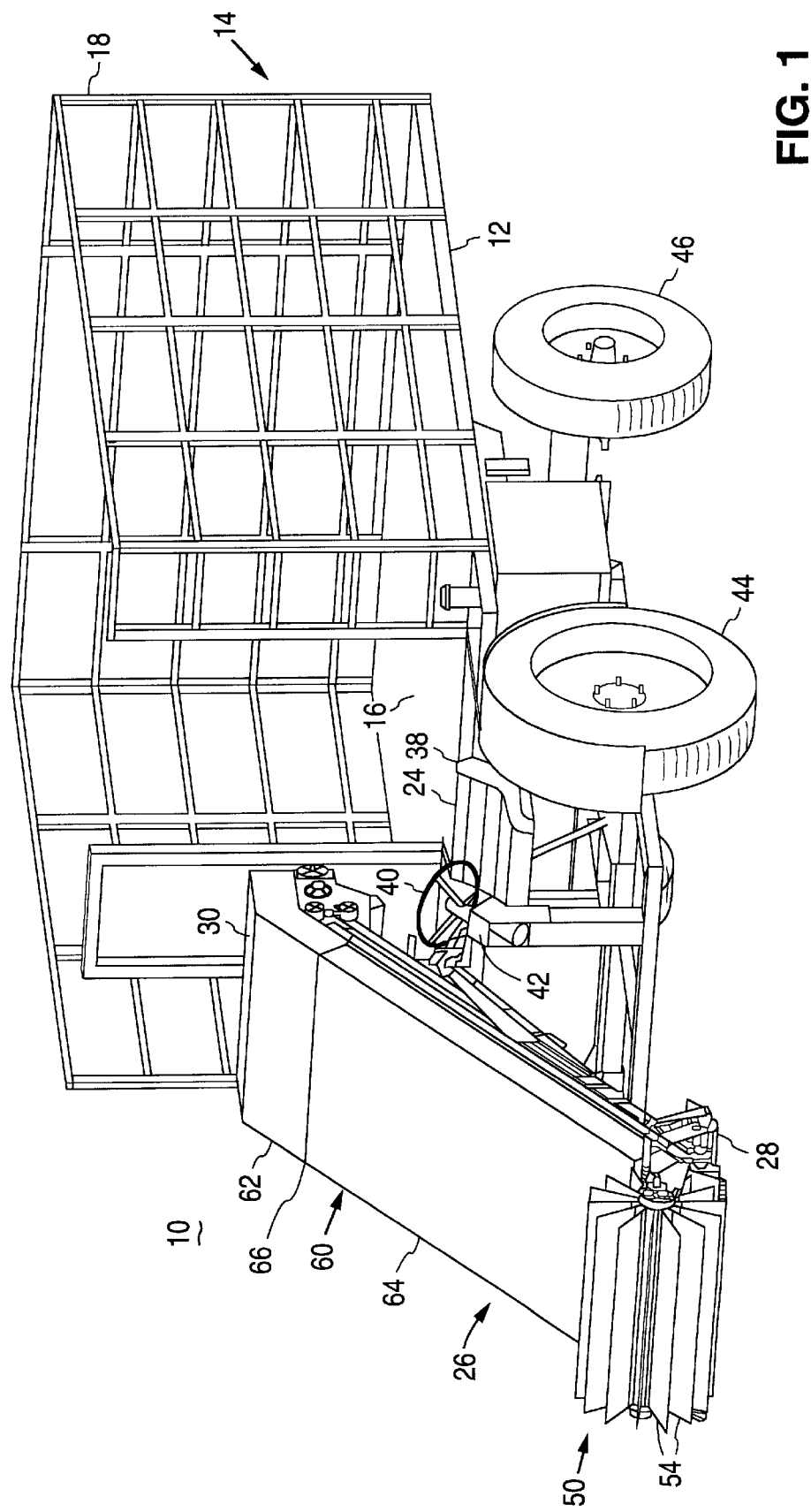
FIG. 1 is a prospective view of the preferred embodiment of a leafy vegetable harvester of the present invention.
Figure 2:
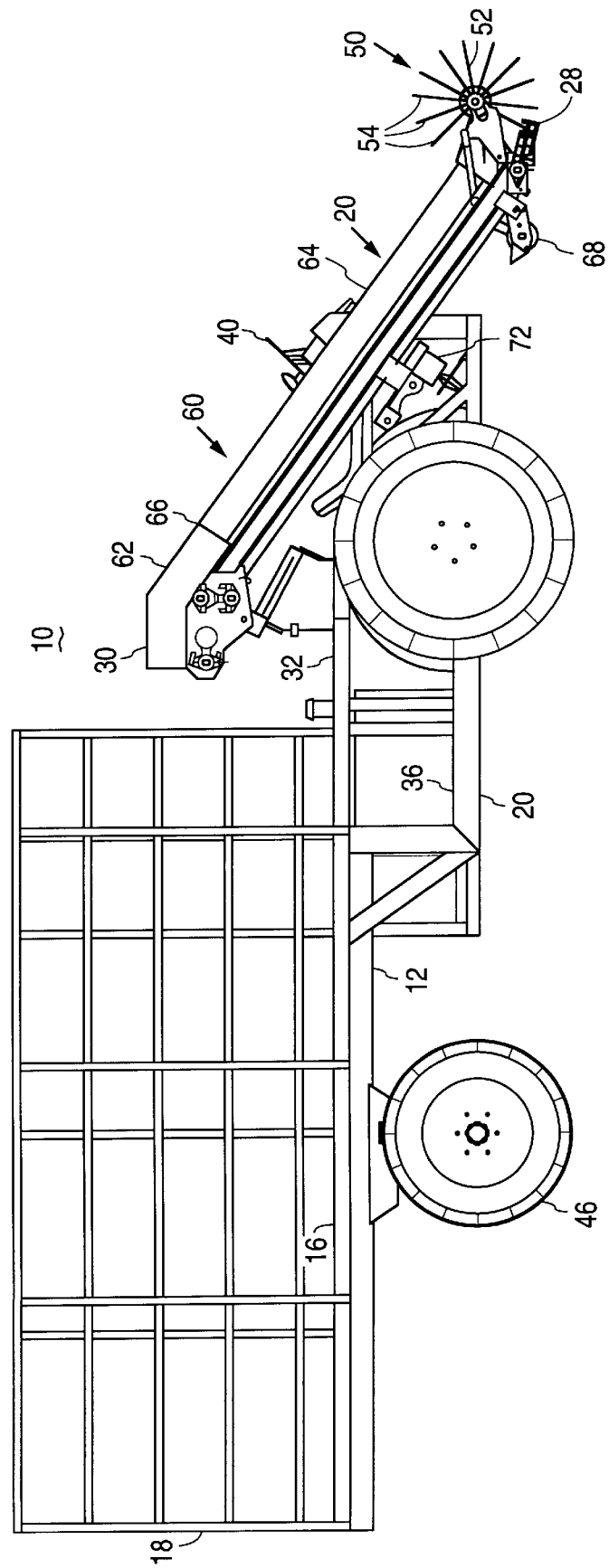
FIG. 2 is a side view of the harvester of FIG. 1.

FIGS. 1–4 illustrate the preferred embodiment of a leafy vegetable harvester 10 in accordance with the present invention. Harvester 10 has a frame or chassis 12 which supports the various components of the harvester. The back part of the harvester has a storage area 14 which includes a platform 16 and railing 18 surrounding the platform 16.

A lower part of the chassis 20 supports an engine 22, an operator's station 24 and an inclined conveying system 26. Mounted at the lower end of the conveyer 26 is a cutting assembly 28. At the top of the conveyer is a discharge portion 30. Immediately underneath the discharge 30 is a receiving platform 32 where empty totes are placed and then filled by the discharged harvested leafy vegetables. An extended portion 34 (FIG. 4) of the receiving platform is used to place the next tote to be filled.

When a tote is filled up with cut leafy vegetables, the next tote is slid under the discharge 30. The filled tote is stored on the platform 16, as are the empty totes to be filled. Typically one worker stands on a small platform 36 to exchange the totes as each is filled and another worker brings the first worker empty totes and places filled totes on platform 16. The storage area can hold as many totes as desired, with 100, stacked five high, being a desirable number.

A third worker sits at a seat 38 and operates the harvester. The steering wheel 40 and a control console 42 form a part of the operator's station.

As is conventional the front pair of wheels 44 are larger than the back wheels 46. The back wheels are the steering wheels. They are larger because they bear most of the weight of the harvester. The front wheels are the drive wheels. The spacing of each pair of wheels 44 and 46 exceeds the double width bed size of 80 inches. The center of each tire should be approximately aligned with the center of the furrow. This results in a spacing, as measured from the middle of each pair of wheels, of 86 inches.

Figure 3:
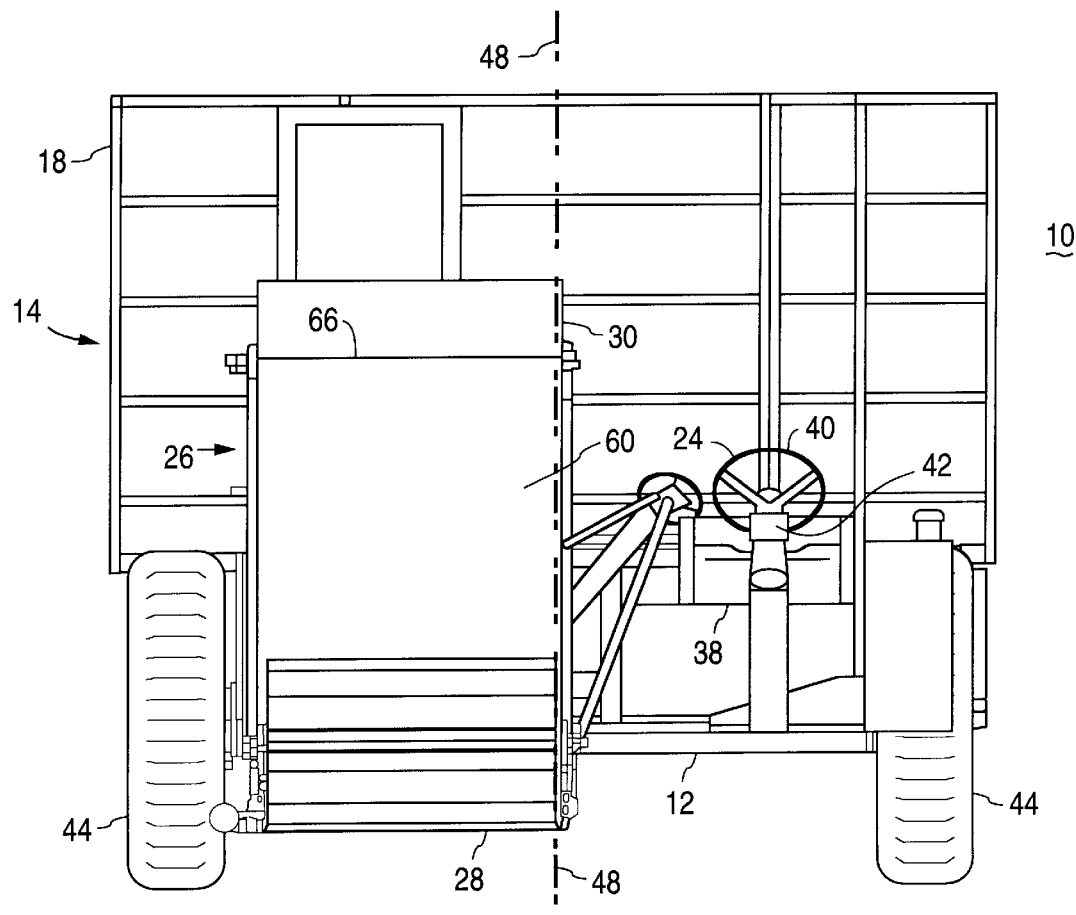
FIG. 3 is a front view of the harvester of FIG. 1.
Figure 4:
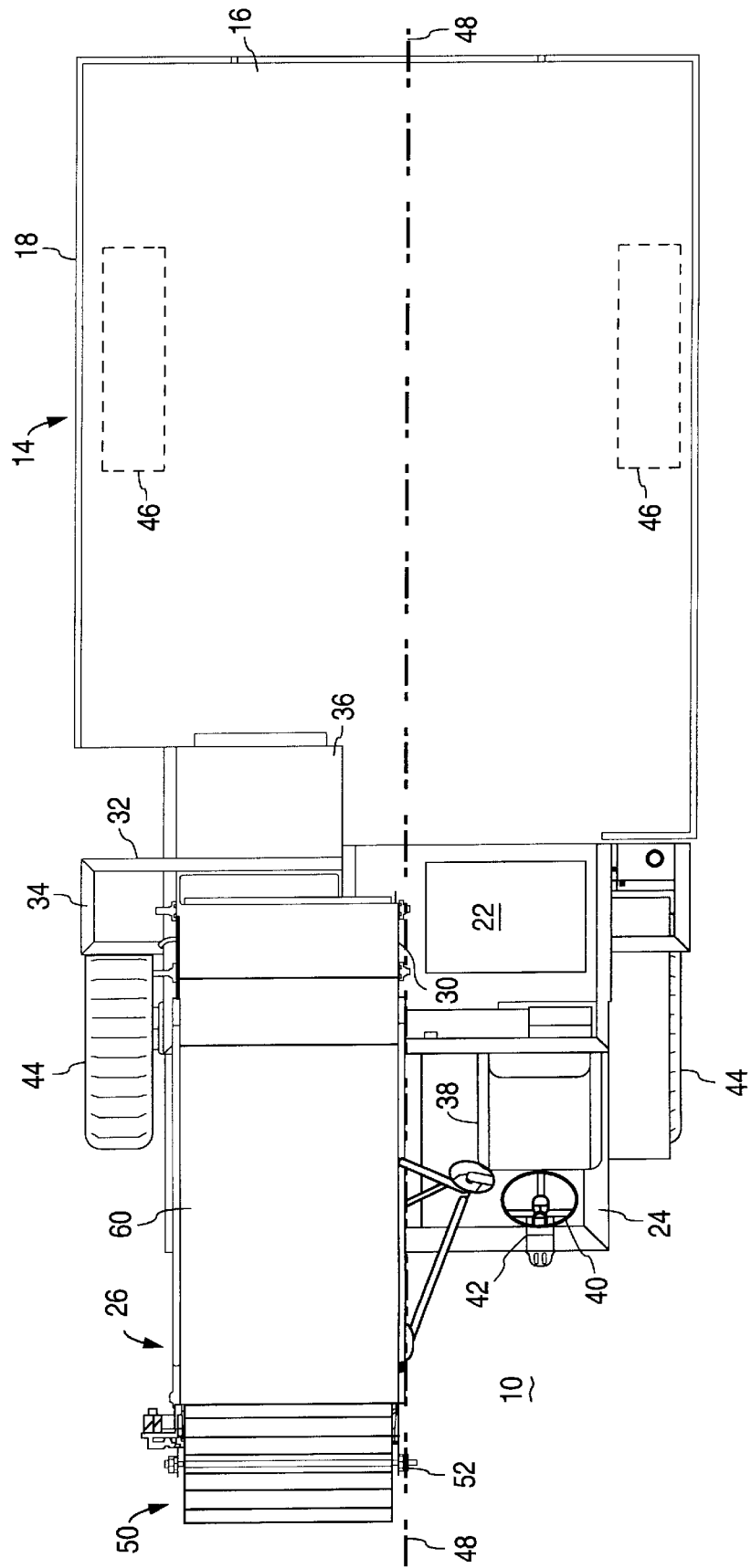
FIG. 4 is a top view of the harvester of FIG. 1.

As best seen by reference to FIGS. 3 and 4, substantially all of the conveyer 26 and cutting mechanism 28 is located on one side of the harvester's centerline 48. The operator's station 24 and engine 22 are located on the other side of centerline 48.

The cutter mechanism 28 is a reciprocating sickle type cutter, with relatively small teeth spaced relatively close together, in the range of about 1 inch, to be able to cut the small leafy vegetable plants. The cutting mechanism from an ordinary hedge trimmer has been found to work satisfactorily.

The width of the cutter mechanism should exceed the width of a standard 42 inch wide bed. A cutter blade of 38 inches is preferred. This allows the harvester to cut leafy vegetables of either the standard 40 inch or 42 inch width bed.

As explained above, harvester 10 can also be used to cut a double size bed of 80 inches. Since the distance between the front pair of wheels 44 and the back pair of wheels 46 is greater than 80 inches the harvester can travel down a field with either standard width or double width rows. If the bed is a double width bed of 80 inches, the harvester 10 first harvests one half of the bed traveling in one direction, and then the other half of the bed, traveling the other direction.

Locating the conveyer and cutting mechanism on one side of the harvester's centerline, and the driver's station and engine on the other, also results in the harvester's weight being relatively equally distributed.

Figure 5:
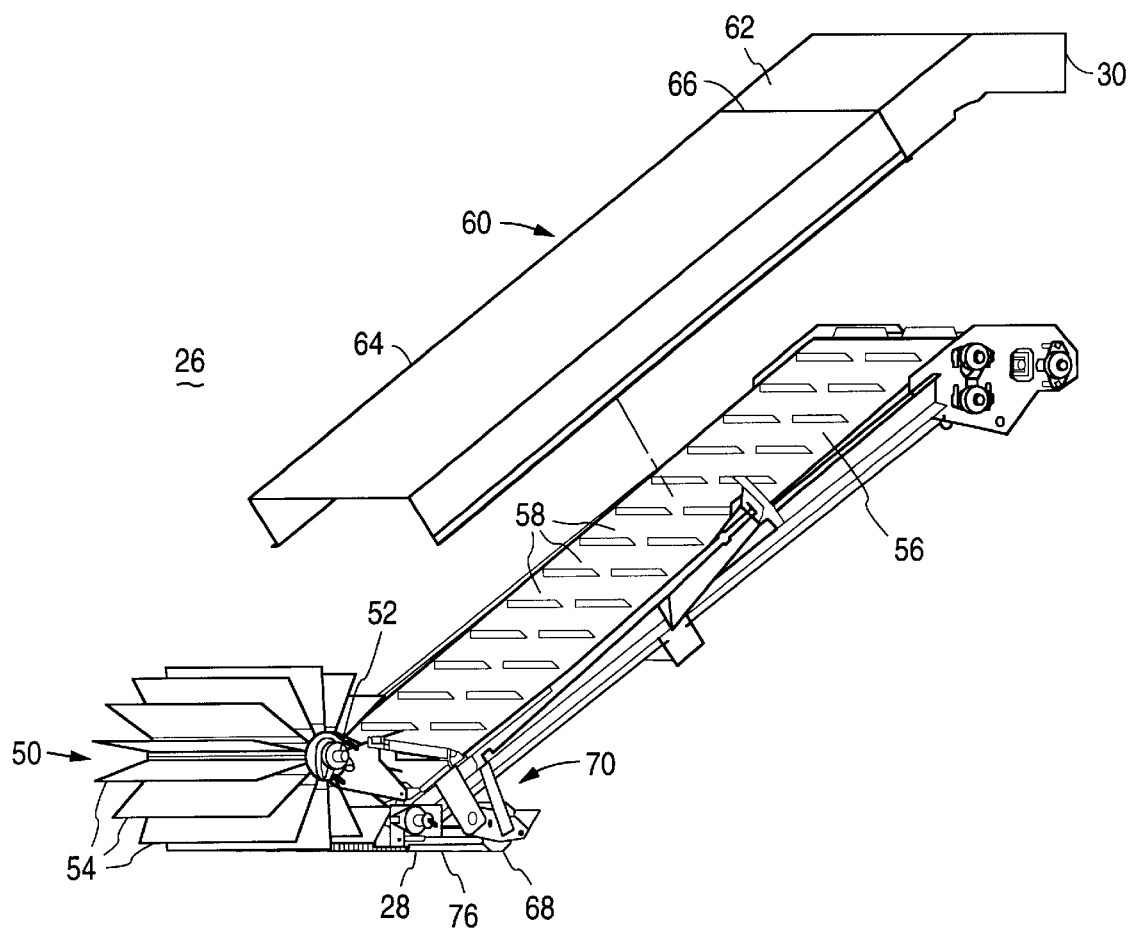
FIG. 5 is an isolated view, partially exploded, of the conveying system of the harvester of FIG. 1.
Figures 6, 7:
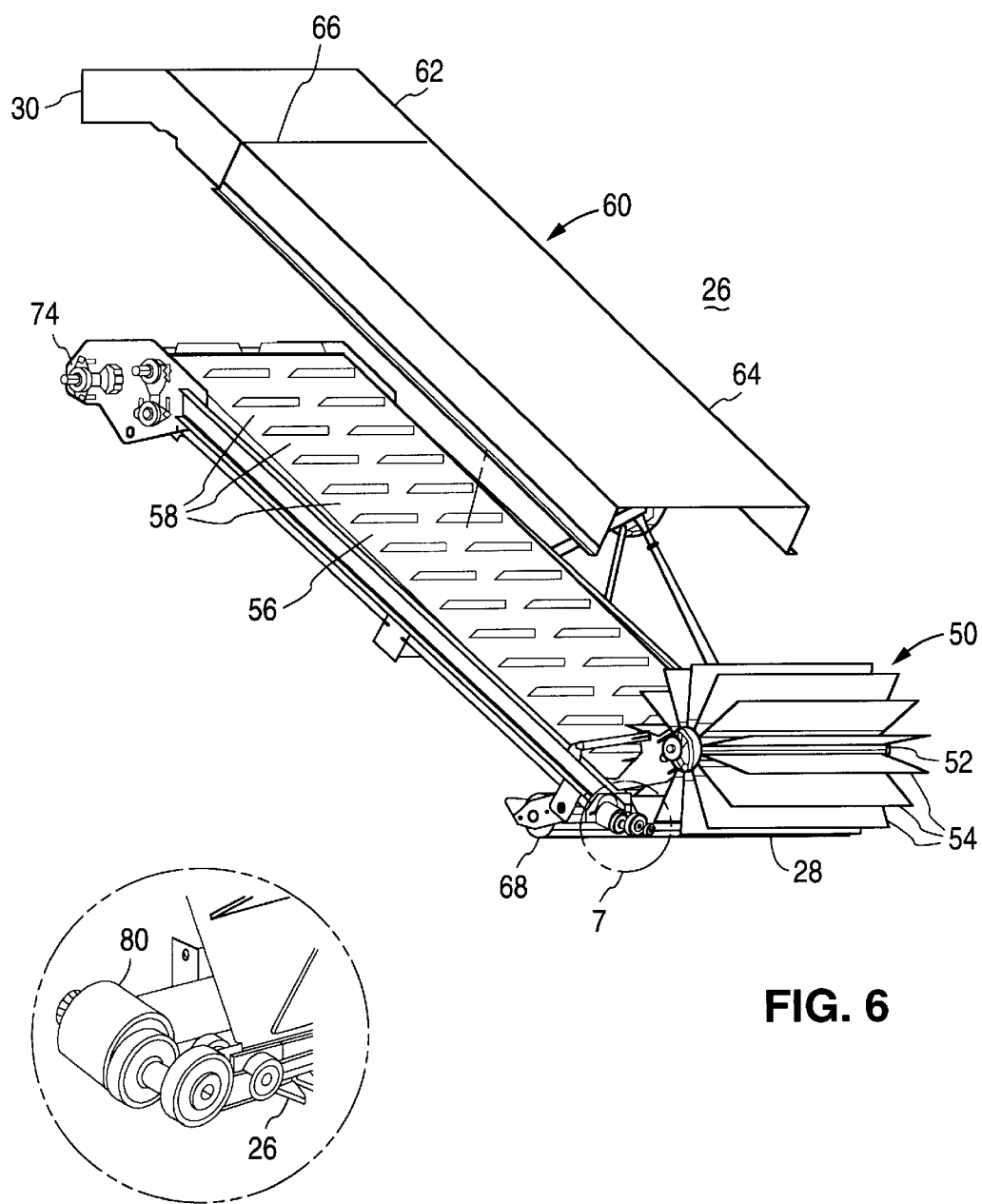
FIG. 6 is an isolated view of the conveying system of FIG. 5.
FIG. 7 is a detail of the cutter and cutter drive mechanism of FIG. 6.

Details of the conveyer system 26 are additionally shown in greater detail in FIGS. 5–7. Mounted to the lower end of the conveyer 26 is a reel 50 which includes a rotatable shaft 52. Radially extending from the shaft 52 are a plurality of slats or brushes 54. Each may be a single strip of flexible material, or each may be formed by a plurality of flexible fingers, from 1 to 2 inches in width, with 1½ inch being optimal. The material forming the fingers is white Nitrile webbing.

The fingers of the reel engage the plants to be cut and bring them in contact with the sickle cutter. This facilitates the cutting action of the sickle cutter, insuring a better cut of the leafy vegetables. The brushes or fingers 54 of the reel 50 also act to convey the cut leafy vegetables onto conveyer belt 56. The belt 56 preferably is a stainless steel mesh with ½ inch by ½ inch openings.

The cut leafy vegetables are held in place as the conveyer 56 transports the produce upwardly towards the discharge portion 30 by means of a plurality of cleats secured, such as by welding, transversely to the mesh conveyer belt 56. Since no pressure is applied to the delicate produce, less bruising and damage occurs than with the double belted conveyer approach.

To keep the leafy vegetables from being blown off of the conveyer 56 an enclosure such as a hood 60 surrounds the conveyer 56. The hood 60 has a fixed portion 62 which is connected to the lower portion 64 by a hinge 66 so that the lower portion 64 can swing upwardly to allow inspection and cleaning of the conveyer 60.

The height of the cutter assembly 28 is set by a gauge roller 68. A control mechanism 70 (FIG. 5) controls the position of gauge roller 68.

As is well known, a hydrostat drive system is used, which includes a variable speed hydraulic transmission for driving and controlling the wheel speed. The steering, operation of the conveyer 56, and rotation of reel 50 is done in conventional fashion, hydraulicly. Engine 22 drives an auxiliary pump (not shown) for providing the hydraulic power necessary. Standard hydraulic motors are used throughout.

The entire conveyer system 26 can be raised and lowered. A hydraulic piston (FIG. 2) is used to raise and lower the conveyer 26. A 40 horsepower John Deere diesel engine 22 is suitable for the engine 22.

As explained, conveyer 56 is powered by a hydraulic motor which is coupled to an upper rotatable shaft 74. The lower end of conveyer 56 passes around a lower shaft 76.

FIG. 7 is a detailed view of one gearing arrangement 80 to convert rotary power of a hydraulic motor for driving the cutter mechanism 28, which requires a reciprocating action between the upper and lower sickle bars. Alternatively, the drive mechanism from a standard hedge trimmer can be used, such as a Shindowia brand drive blade, although the reciprocating speed needs to be increased for the best cutting action. A reciprocating rate of 450–600 strokes per minute has been found to be effective.

Figure 8:
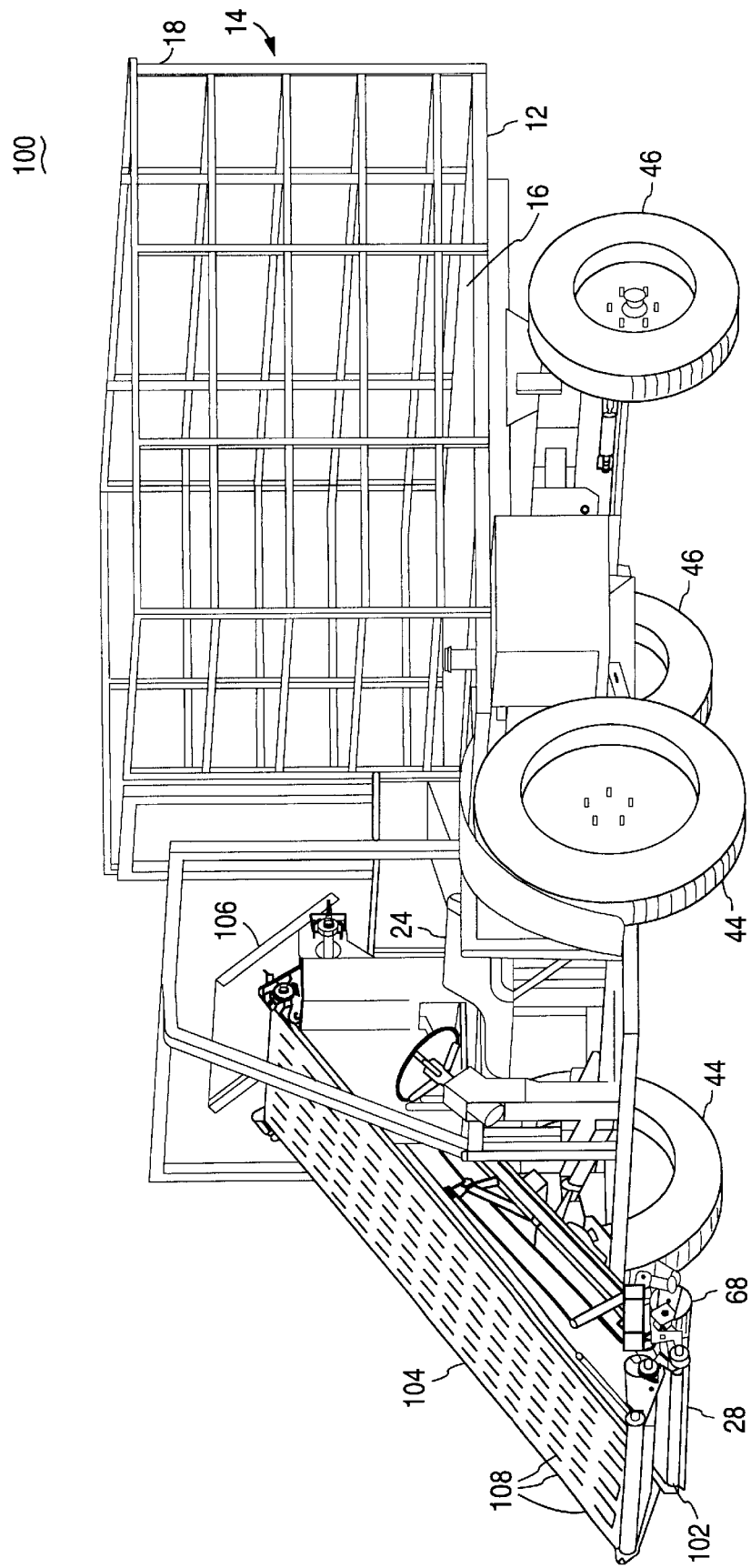
FIG. 8 is a prospective view of an alternative leafy vegetable harvester of the present invention.
Figure 9:
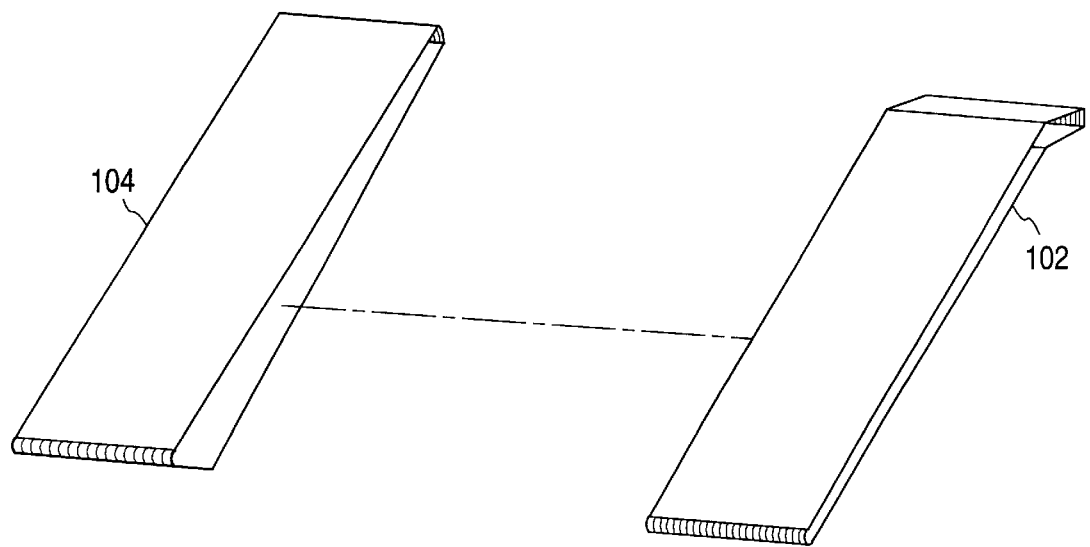
FIG. 9 is an isolated view of the cutter/conveying system of the harvester of FIG. 8.
Figure 12:
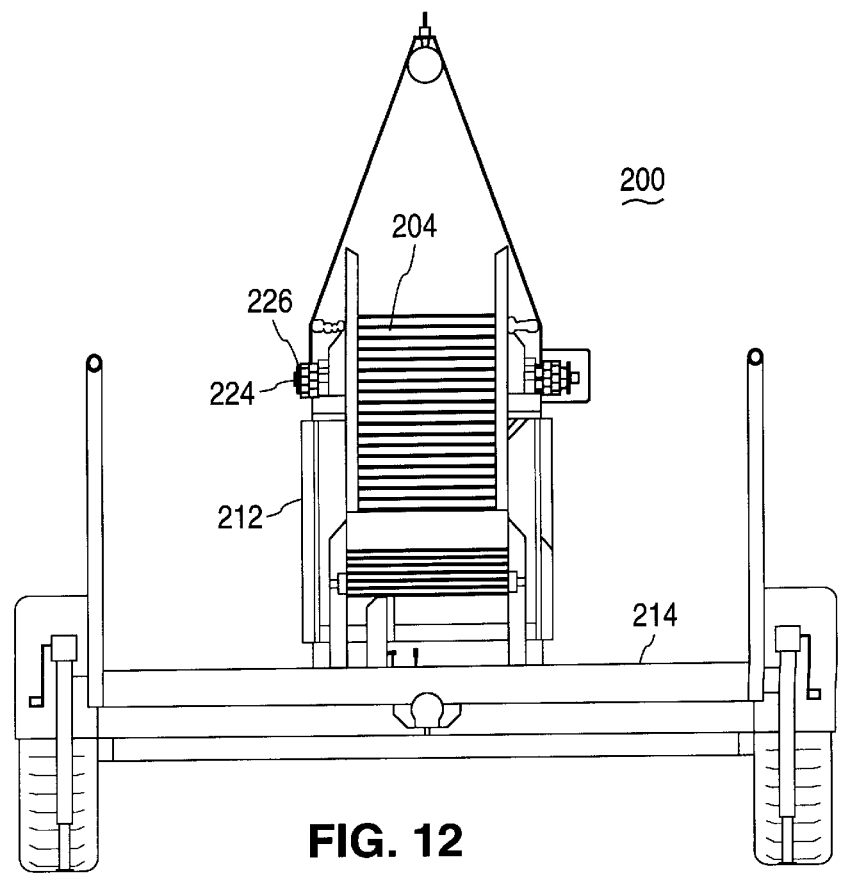
FIG. 12 is a front view of the shaker/cleaner of FIG. 10.
Figure 10:
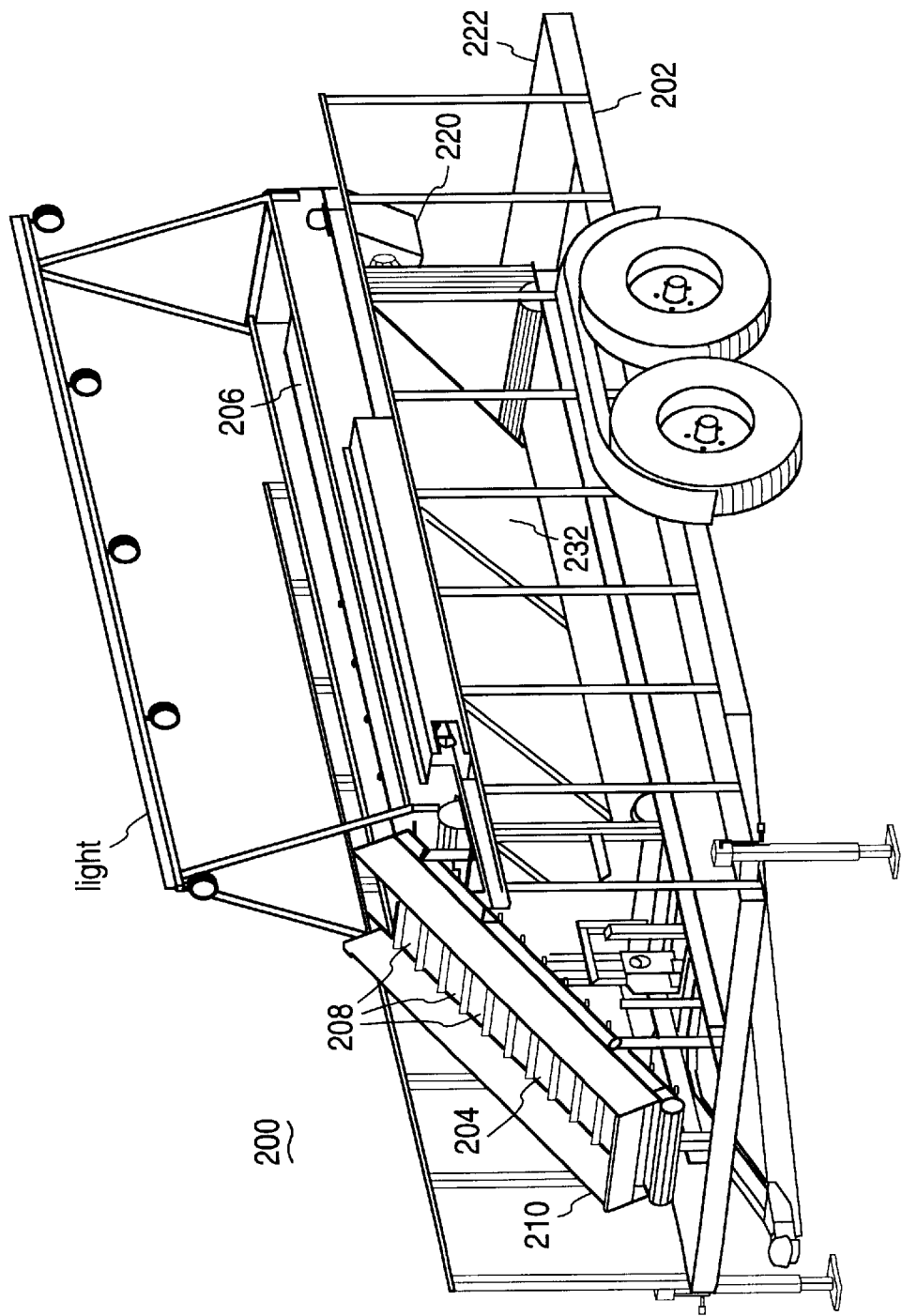
FIG. 10 is a prospective view of the shaker/cleaner used in the improved leafy vegetable harvesting method of the invention.
Figure 11:
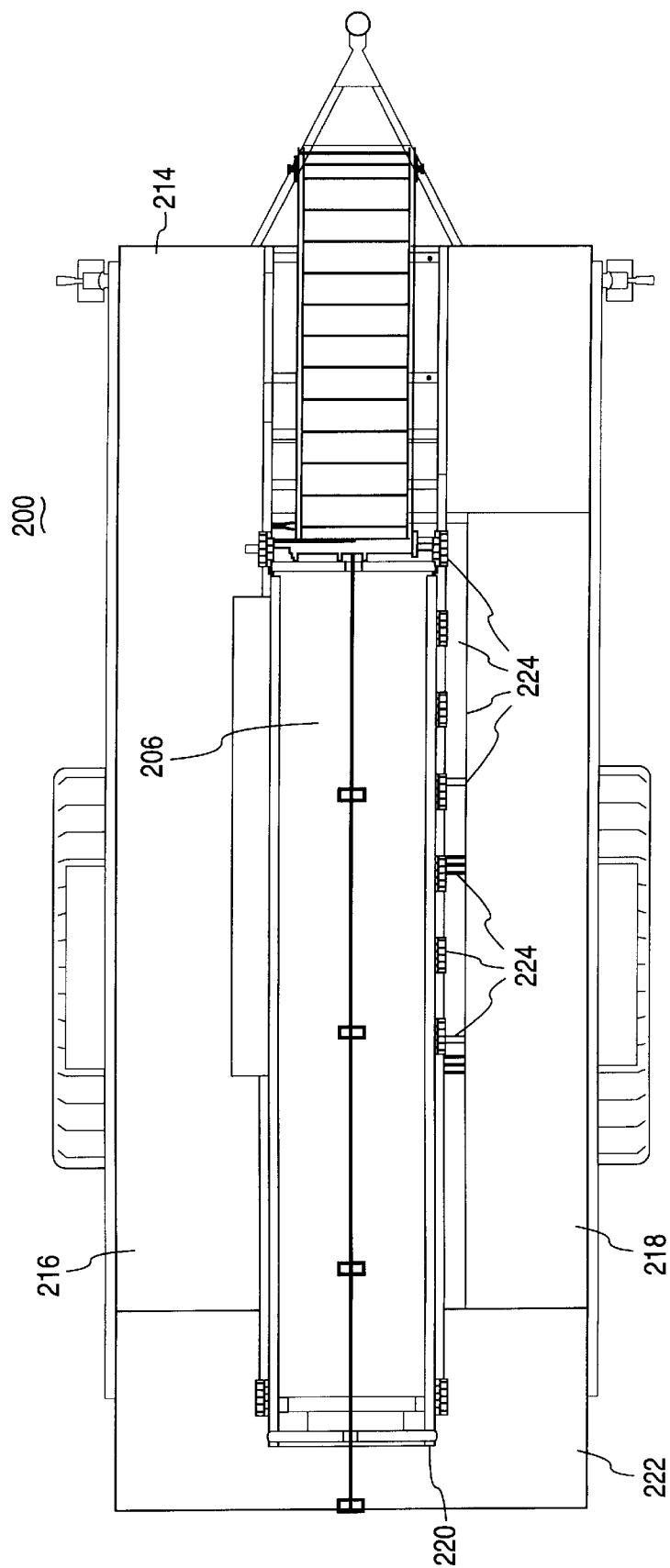
FIG. 11 is a top view of the shaker/cleaner of FIG. 10.
Figure 13:
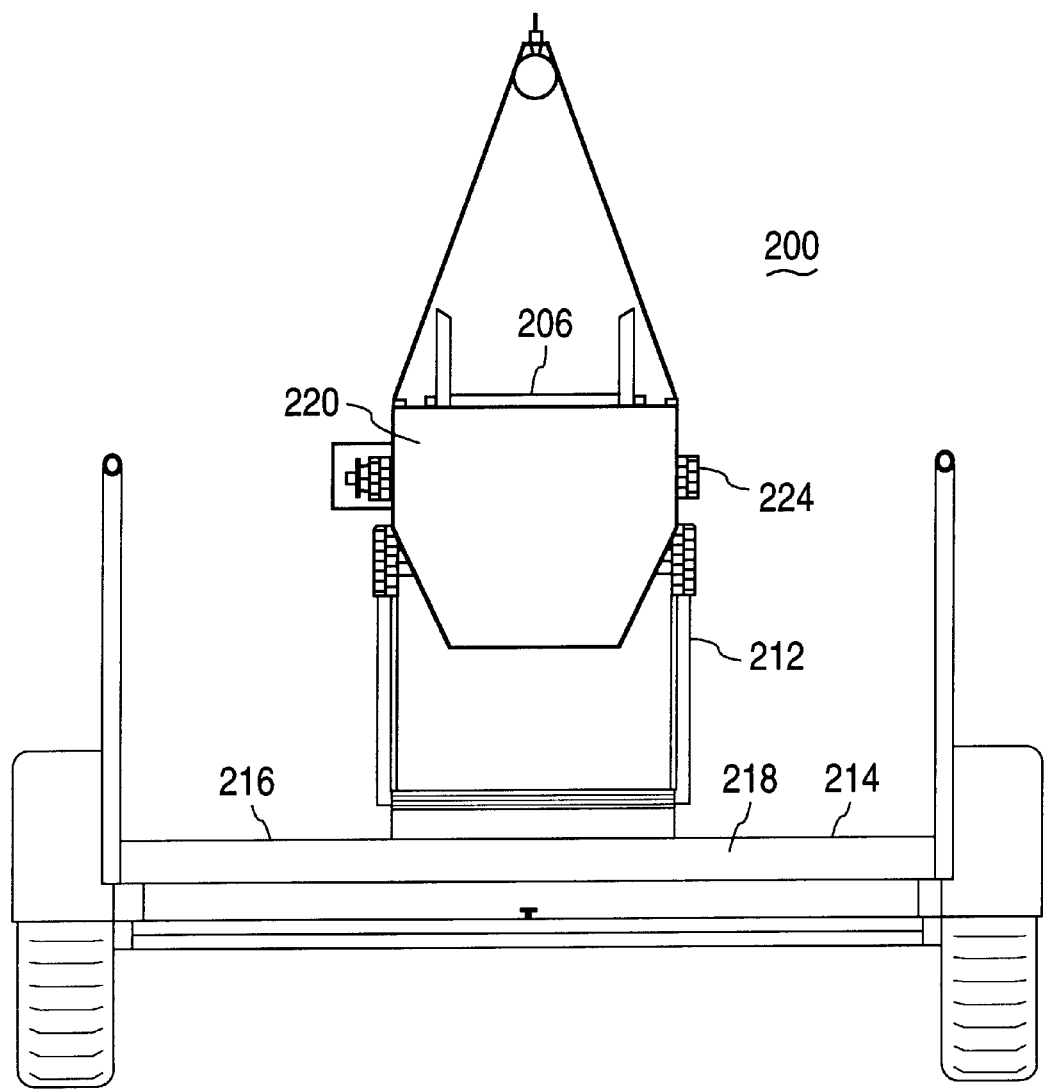
FIG. 13 is a rear view of the shaker/cleaner of FIG. 10.
Figure 14:
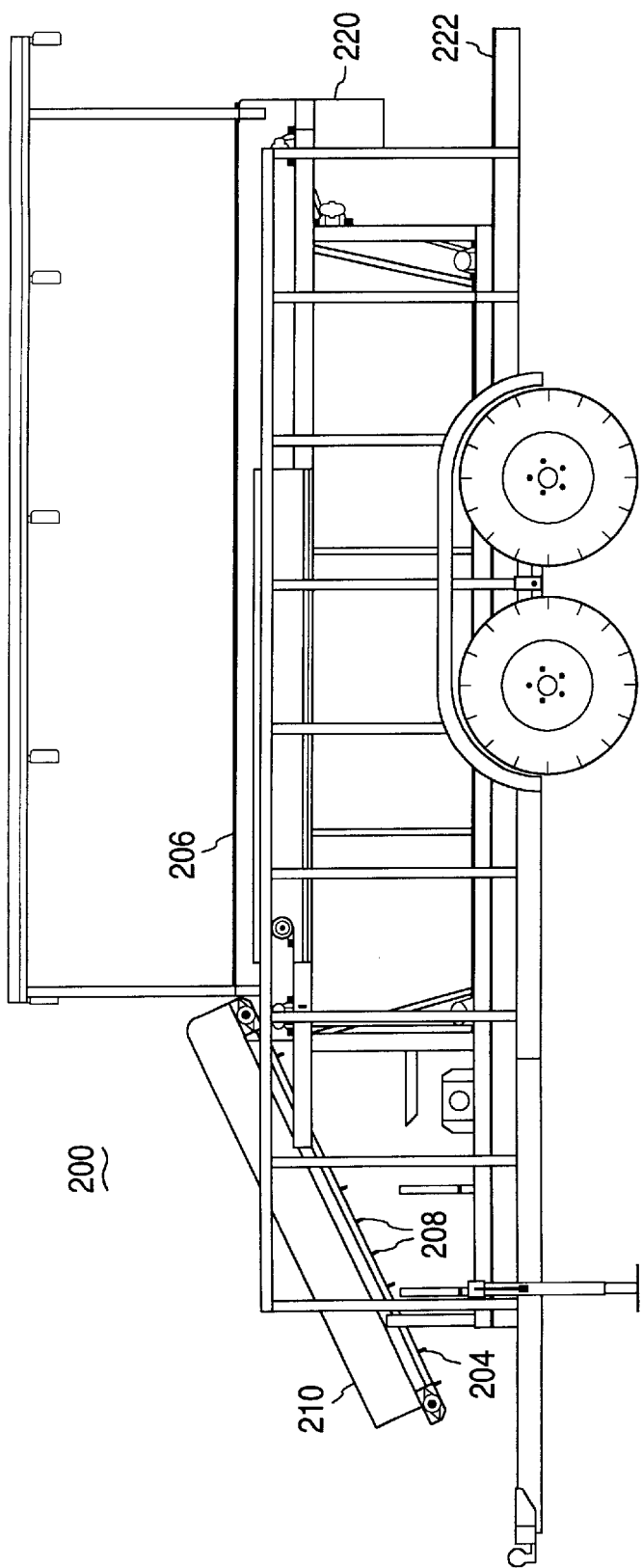
FIG. 14 is a side view of he shaker/cleaner of FIG. 10.

FIGS. 8 and 9 show an alternative embodiment of the improved harvester 100 of the present invention, capable of use with either single or double size beds. Harvester 100 is similar to the preferred harvester 10 of FIGS. 1–7, with the major difference being the construction of the conveyer means 26. Like elements are labeled with the same reference numbers in FIGS. 8 and 9.

Here the conveyer means comprises two conveyer belts, a lower belt 102 and an upper belt 104. The lower conveyer 102 conveys the cut leafy vegetables upwardly to a discharge chute 106. The belt 102 is a conventional alloy steel wire conveyer. The conveyer circulates in a clockwise direction as viewed in FIGS. 8 and 9.

The upper conveyor belt 104 circulates in the opposite direction, counter-clockwise, and at the same speed as lower belt 102. If there is a speed differential, damage to the produce occurs. Belt 104 preferably is made of flexible 3-ply poly 90 belting. Attached to the belt 104, for example by glue, are a plurality of flaps or fingers 106, shown figuratively in FIG. 8. The flaps are preferably made of 2-ply poly white Nitrile. The width of each finger is desirably about 2½ inches.

FIGS. 10–15 illustrate a shaker/cleaner apparatus 200 which is utilized in the improved harvesting and cleaning method of the present invention. Once the totes on the harvester are filled, they are transported to the shaker/cleaner 200, which is supported by and is transported by a trailer 202. The shaker/cleaner is stationary when in use.

An input conveyer 204 is used to transport the cut leafy vegetables to the mesh conveyer 206. The conveyer 204 is inclined upwardly so that cut leafy vegetables can more easily be dumped onto the conveyer 206 by workers. The conveyer 204 has affixed to it a plurality of cleats 208 and side walls 210 to aid in conveying the produce upwardly.

The two conveyers are supported by a frame structure 212 mounted to a platform 214 supported by the trailer 202. Platform 214 provides two surfaces 216 and 218 for workers to stand, adjacent to the mesh conveyer 206, for the purpose to be explained.

Cut leafy vegetables discharged from the input conveyer 204 are transported by the mesh conveyer 206 to a discharge portion 220. Empty totes or baskets are placed on a receiving platform 222 for receiving the leafy vegetables exiting the mesh conveyer 206.

Harvested leafy vegetables typically have a certain amount of debris, damaged leaves, and unwanted materials associated with it. The mesh conveyer 206 has a chain-type mesh surface such as galvanized flat wire belting with openings approximately one inch by one inch to allow such unwanted materials to fall through the conveyer. To increase the amount of unwanted material which is passed out through mesh conveyer 206, the mesh conveyer is shaken or oscillated as it circulates toward the discharge portion.

This is accomplished by providing a plurality of shafts underneath and supporting mesh conveyer 206. The shafts 24 are mounted off-center as will be explained. When rotated they "wobble", thus imparting an oscillating motion to the conveyer 206 to shake out unwanted material.

Figure 15:
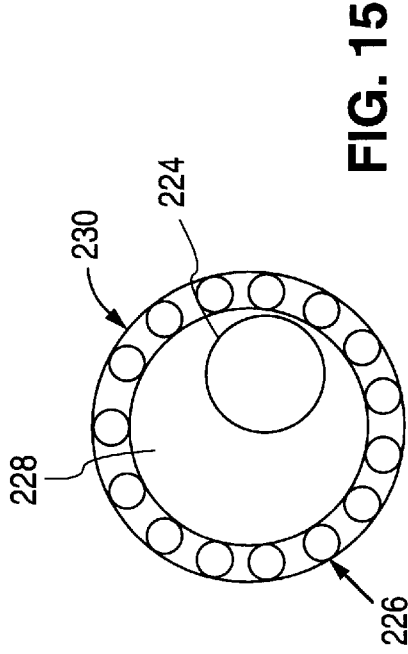
FIG. 15 is a detailed cross-sectional view of the mechanism for oscillating the mesh conveyer of the shaker/cleaner of FIG. 10.

A detailed cross-sectional view of one of the bearings 226 for one of the shafts 224 is shown in FIG. 15. The bearing has a cross-sectional dimension greater than the shaft 224, with an outside diameter of four inches and an inside diameter of 2.165 inches. A bushing 228 is inserted within the race 230 of the bearing. The bushing as drilled in it a hole having a dimension of that of the shaft 224. The hole is provided off center of the bushing. Thus when the drive mechanism (not shown) rotates the shaft 224, the rotation of the shaft 224 will rotate off center, causing the shaft to go up and down. This in turn, causes the mesh 226, which travels across the surface of the bearings to go up and down.

Workers standing on either side of the conveyer 206 can remove unwanted or damaged produce which does not fall through the mesh. Debris which falls through the mesh is diverted down and away by a plate 232 (FIG. 10) affixed at a 45 degree angle below conveyer 206.

A gasoline engine (not shown) is mounted below input conveyer 204 to provide power to a hydraulic pump (not shown) to motors for driving the two conveyers, in a conventional fashion. Each of the shafts 224 is driven by a single hydraulic motor.

What is claimed is:

1. A method of harvesting and cleaning leafy vegetables comprising the steps of:

driving a self-propelled harvesting machine along a bed of leafy vegetables to be harvested;

cutting the leafy vegetables;

transporting the cut harvested leafy vegetables up a conveyer apparatus;

discharging the harvested leafy vegetables into individual receiving baskets;

transporting the baskets to a cleaner/shaker apparatus;

depositing the contents of each basket onto an input conveyer belt;

transporting the harvested leafy vegetables along the input conveyer belt;

discharging the harvested leafy vegetables onto a mesh conveyer belt;

oscillating the mesh conveyer belt so as to cause debris and other unwanted materials associated with the harvested leafy vegetables to fall through the mesh; and discharging the leafy vegetables into empty receiving baskets.

2. The method of claim 1 including manually removing debris and other unwanted materials as the harvested leafy vegetables are conveyed by the mesh conveyer belt.

3. The method of claim 1 wherein the step of oscillating the mesh conveyer includes the step of shaking it from underneath.

4. A mechanized process for harvesting and treating leafy vegetables comprising:

cutting leafy vegetables planted in beds using a self-propelled mechanical harvester;

discharging the cut leafy vegetables into empty receptacles on the harvester;

transferring the filled receptacles to a stand alone cleaner/shaker machine, manually transferring the cut leafy vegetables from the receptacles to a horizontally oriented mesh conveyer where debris can fall through the mesh conveyer;

shaking the mesh conveyer to increase the amount of debris falling through the mesh conveyer;

manually removing other debris and other unwanted material as the cut leafy vegetables pass along the mesh conveyer; and discharging the cleaned leafy vegetables into empty receptacles.

5. The method of claim 4 wherein the step of shaking the mesh conveyer includes the step of imparting an oscillation to the mesh conveyer from beneath it.

6. An apparatus for separating debris and other unwanted materials from harvested leafy vegetables comprising:

an input conveyer belt;

means for depositing harvested leafy vegetables containing debris onto the input conveyer belt;

means for transporting the harvested leafy vegetables along the input conveyer belt;

a mesh conveyer; means for discharging the harvested leafy vegetables onto a mesh conveyer; and means for oscillating the mesh conveyer so as to cause debris and other unwanted materials associated with the harvested leafy vegetables to fall through the mesh.

7. The apparatus of claim 6 including:

means for discharging the leafy vegetables into empty receiving baskets.

\* \* \* \* \*